S. A. TOMBS.
Cultivator.
No. 42,737.
Patented May 10, 1864.
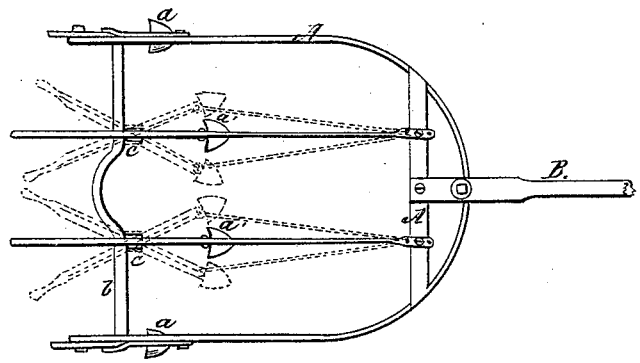
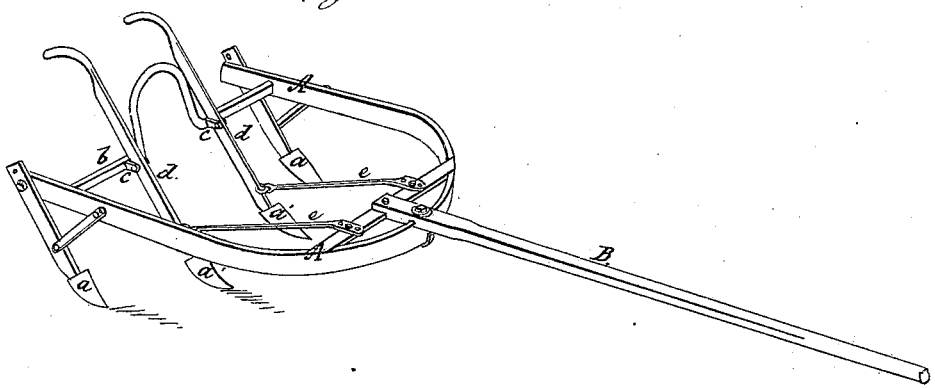
Witnesses:
W. J. Clark
D. L. Reid.
Inventor:
Wm Clough Atty

UNITED STATES PATENT OFFICE.

SAMUEL A. TOMBS, OF ASHLEY, MISSOURI, ASSIGNOR TO HIMSELF AND SAMUEL N. PURSE, OF SAME PLACE.

IMPROVEMENT IN CULTIVATORS.

Specification forming part of Letters Patent No. 42,737, dated May 10, 1864.

*To all whom it may concern:*

Be it known that I, S. A. TOMBS, of Ashley, in the county of Pike and State of Missouri, have invented a new and useful Improvement in Cultivators; and I do hereby declare the following to be a full, clear, and exact description thereof, reference being had to the accompanying drawings and letters of reference marked thereon, forming part of this specification.

My invention relates to cultivators consisting of four or more teeth or shares, of which the outer teeth (two or more) are fixed or stationary on the cultivator-frame, and two inner teeth are carried by the lower ends of pivoted handles, by which their direction and relative position are controlled by the attendant.

The implement is designed to cultivate on both sides of a standing row of corn or other cultivatable crop, and the operator, by controlling the position of the two central teeth which traverse one on each side of the standing row, is enabled so to direct them as to cultivate the earth very near to the standing corn without disturbing or uprooting it.

In the accompanying drawings, Figure 1 is a perspective view of an implement in which my improvements are presented. Fig. 2 is a top view or plan. In the latter are represented, in red lines, different positions in which the central or pivoted teeth may be held relatively to each other and the outer or fixed teeth.

Like letters of reference indicate like parts in the two representations.

A is the frame of the implement; B, the tongue. To each side or outer extremity of the implement fixed cultivator-teeth *a a* are attached in any suitable manner. Another pair of fixed teeth, one on each side, may be attached to the frame, if desired.

*b* is a bar extending across the rear part of the frame and forming a part thereof. At an appropriate distance outward, in opposite directions from the center of *b*, bifurcated studs *c c* project forward from the cross-bar *b*, in which they are pivoted, and these receive and carry the handles *d d*. The lower ends of the handles carry each a cultivator-tooth, *a' a'*.

*e e* are stay-rods extending from the forward part of the frame, to which they are pivoted, back and downward to the handles *d*, where, at a suitable distance above the ground, they are freely secured, retaining the arms with their teeth in appropriate inclination to the ground.

The construction and arrangement of the parts which have been described are such that the operator, by spreading the upper ends of the handles apart, causes the cultivator-teeth carried by their lower ends to approach each other, and also to traverse nearer to a row of corn between them—to any desired proximity with the plants. By contracting the upper ends of the handles the space between the teeth is of course increased to any necessary extent. Each handle with its tooth may be varied independently and without reference to the other, so that the proximity of each to the standing row may be controlled respectively, and any obstruction in the track of either may be shunned.

The form and general construction of the frame herein presented I have adopted for convenience and utility.

I do not claim broadly pivoting or bracing the handles or standards *d* to the frame A, as I am aware that it is not new; but

What I claim as my invention, and desire to secure by Letters Patent, is—

A cultivator-frame constructed of the curved bar A, united at its rear by the curved cross-bar *b*, and provided with the stationary standards and cultivator-teeth *a* and pivoted standards or handles *d*, the whole constructed and arranged substantially as herein set forth.

SAMUEL A. TOMBS.

Witnesses:
E. J. STROTHER,
B. F. MCPIKE.